Figure 1:
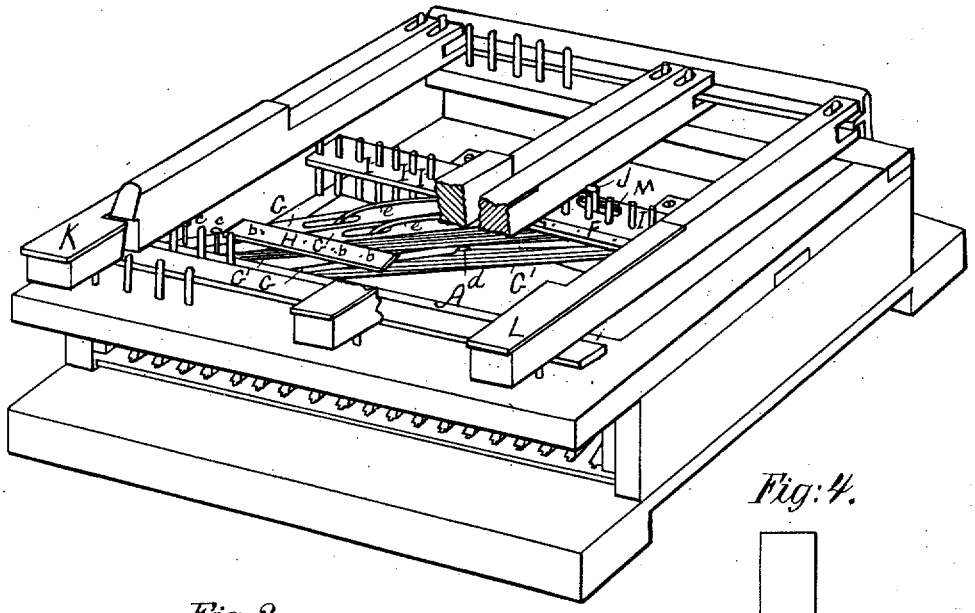

BEST AVAILABLE COPY

W. D. PARKER,
Assignor to J. P. RICHARDSON.

Octave and Manual Coupler for Organs.

No. 9,497. Reissued Dec. 7, 1880.

Witnesses.
Geo Ames
W. S. Bellows

Inventor,
W. D. Parker.
Per Brown Bros.
Attorneys.

N. PETERS, PHOTO-LITHOGRAPHER, WASHINGTON, D. C.

2 Sheets—Sheet 2.

W. D. PARKER,

Assignor to J. P. RICHARDSON.

Octave and Manual Coupler for Organs.

No. 9,497. Reissued Dec. 7, 1880.

Witnesses:
Geo Ames
W. E. Bellows

Inventor,
W. D. Parker.
Per Brown Bros.
Attorneys.

N. PETERS, PHOTO-LITHOGRAPHER, WASHINGTON, D. C.

BEST AVAILABLE COPY

UNITED STATES PATENT OFFICE.

WILLIAM D. PARKER, OF WORCESTER, MASSACHUSETTS, ASSIGNOR TO JOHN P. RICHARDSON, OF SAME PLACE.

OCTAVE AND MANUAL COUPLER FOR ORGANS.

SPECIFICATION forming part of Reissued Letters Patent No. 9,497, dated December 7, 1880.

Original No. 188,175, dated March 6, 1877. Application for reissue filed August 12, 1880.

*To all whom it may concern:*

Be it known that I, WILLIAM D. PARKER, of the city and county of Worcester, and State of Massachusetts, have invented certain new and useful Improvements in Organ-Actions, of which the following is a specification.

This invention relates to mechanism for opening the valves of an organ by the depression of the keys, which mechanism is applicable as an octave and a manual coupler, and is herein particularly described and shown in such connection.

As is well known, a coupler for organs consists, in substance, of mechanism disposed and arranged between the key of one note and the valve of another note in a manner for both notes to be simultaneously sounded, if so desired, by striking the key of the one note. These couplers are known generally as "octave" and "manual" couplers. An octave coupler couples two notes an octave apart in the same bank of keys, and a manual coupler couples notes in separate and distinct banks of keys—as, for instance, in a double bank of keys, a note in the one bank with a note in the other bank. In all of these couplers the mechanism for working upon the valves is repeated for each key and valve, and this mechanism, as heretofore generally constructed and arranged, at all times rests and bears upon the valve to which it belongs, and always rises and falls with the movement of such valve.

Among the objects of this invention are, first, to secure complete relief to the valve from the weight of its coupling mechanism when such valve is not coupled to a key, or, in other words, when the coupler is off; second, to have when the coupler is on—that is, adjusted for action—all the points of contact close and ready to move without slack or jar; and, third, to automatically assist a key in its opening of a valve, and thus lighten the touch of a key.

This invention consists, first, of the interposition and arrangement, between a key and a valve to an organ, of a spring in a manner to automatically assist in the opening of the valve against its spring when the key is depressed, and thereby lighten the touch of the key; second, of two levers, one resting and turning upon the other, and both arranged of themselves and in relation to a key and a valve for the key to press upon the upper lever, and the lower lever to press upon the valve, and in such manner that the key, when depressed, acts through such levers to open the valve, and when released permits the valve, by the reaction of its spring, to close; third, of two levers, one resting and turning upon the other, and both arranged of themselves and in relation to a key and a valve for the key to press upon the upper lever, and the lower lever to press upon the valve, and in such manner that the key, when depressed, acts through such levers to open the valve, and when released permits the valve, by the reaction of its spring, to close, in combination with a spring applied and arranged in relation to said levers and their movements in a manner to exert a pressure on them against the spring of the valve when the valve is being opened, and thereby assist in such opening of the valve, and to allow the spring of the valve to close the same when the pressure on the key is removed; fourth, in the disposition and arrangement of mechanism, substantially such as above described, for opening a valve through the depression of a key in a manner for such mechanism to be put into and out of connection with the valve, and when in connection to have a close and intimate contact therewith, and when out to be wholly free thereof and of its movements.

Figure 6:
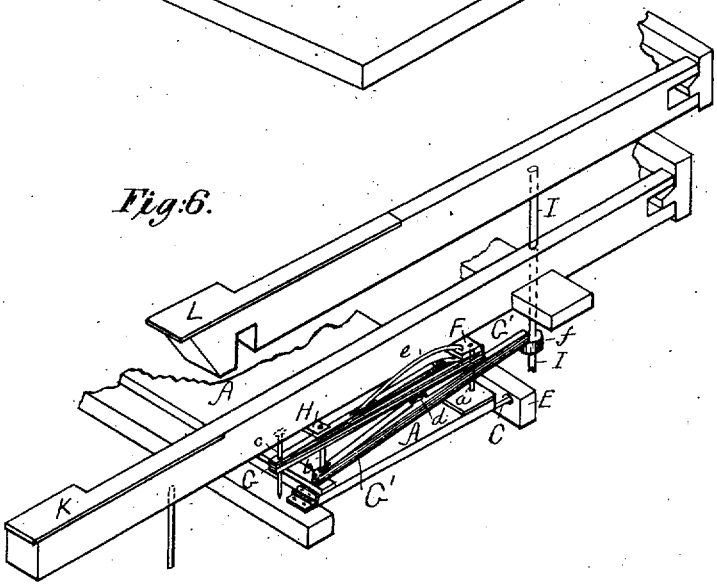

In the accompanying plates of drawings the present invention is illustrated in reference to its use as a coupler, and in all figures except Figure 6 it is shown as adapted for an octave-coupler.

Figure 4:
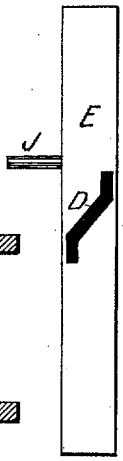
Figure 2:
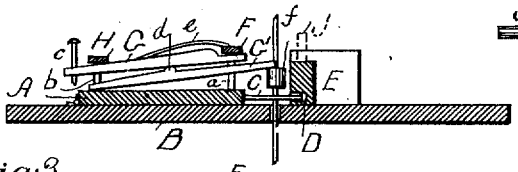
Figure 3:
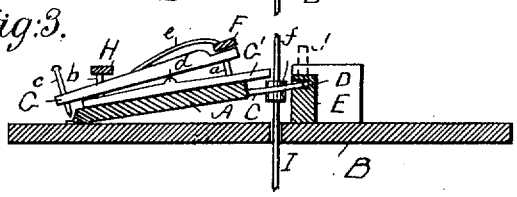
Figure 5:
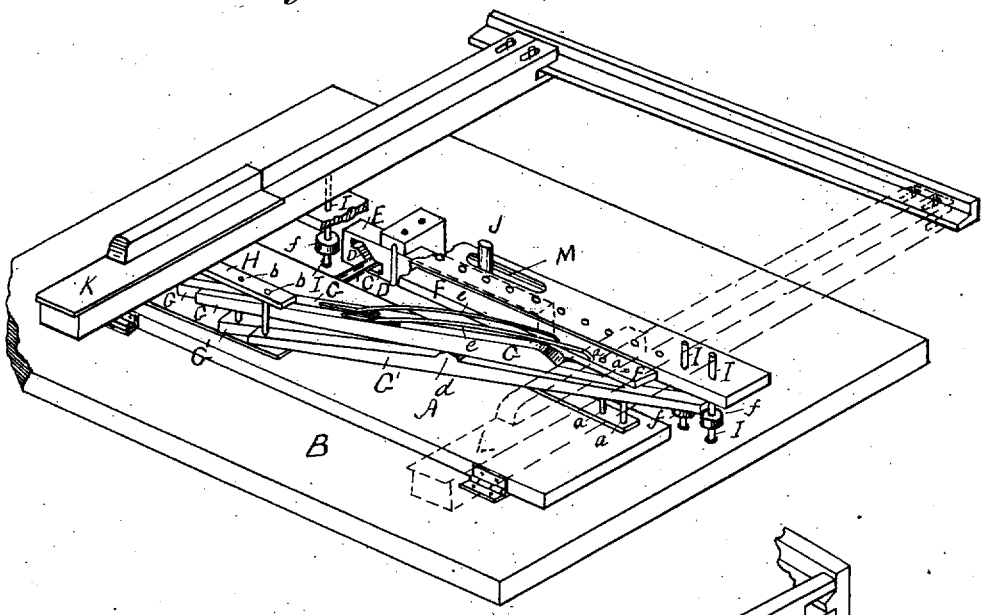

In Plate 1, Fig. 1 is a view in perspective of the key-board mechanism of an organ, showing my improved mechanism as applied to the keys and valves thereof, and for its better illustration many of the parts of the key-board mechanism are either removed in whole or in part. Figs. 2 and 3 are detail vertical sectional views in a line parallel with the levers and spring, which are disposed between a key and a valve to open the valve as the key is depressed, and to assist the key in such opening. The levers are shown in side elevation, and in Fig. 2 as in position to operate on the valve when the key is depressed, and in Fig. 3 as out of such operating position. Fig. 4 is a side view of a device for putting the levers into and out of position for operation. In Plate 2, Fig. 5 is a perspective view of the lever mechanism between a key and a valve; Fig. 6, a view in perspective of the lever mechanism arranged between a key and a valve, and to act as a manual coupler.

In the drawings, B represents a horizontal board, and A a platform, hinged at its front edge to the upper side of the board B and below the series of organ-keys, which are arranged, as usual, above the board B. This platform A extends across the length of the keys, and at its rear edge carries a pin, C, which enters a cam-slot, D, in the vertical face of the bar E, arranged to slide in the direction of the length of the platform A. This bar E is operated by a pin, J, attached to its upper side, which pin projects and works through a slot, M. It can, however, be operated in any suitable manner.

The shape of cam-slot D is such as to raise and lower the platform A upon its hinge, according as the bar E is moved in either the one or the other direction.

*a* is a row of vertical stud-pins secured to the upper side of platform A along its length and near its rear edge, and *b* a row of vertical stud-pins secured to the upper side of platform A along its length and near its front edge. The pins *a* and *b* are in parallel rows, and there is a pin of each row under each key, and the upper ends of the several pins of each row are secured to parallel horizontal cap-strips F and H, respectively.

G G′ are levers mounted horizontally in pairs upon the stud-pins *a* and *b*, between the hinged platform A and the cap-strips F and H. The mounting and arrangement of the levers in pairs are as follows: Each lever G is above and rests upon a raised projection, *d*, about midway of the lever G′ belonging to it. Both levers have holes through them for the passage of the pins *b*, which holes are suitably shaped for the levers to freely play or move upon the pins when operated, as hereinafter described.

Each upper lever, G, at its rear end rests against the under side of the cap-strip F, and such bearing is its fulcrum, and each lower lever, G′, at its front end rests upon the upper side of the platform A, and such bearing is its fulcrum.

Each upper lever at its front end carries a vertical screw-pin, *c*, which is adjusted or regulated as to height by screwing it into and out of the lever. Each of the adjustable pins *c* is so arranged as to be in a line coincident with a central line through the keys, and said pins *c* are also in a line with the respective guide-pins *b*. When the platform A is lowered, by moving the slotted bar E, as herein described, the several adjustable pins *c* are brought against and into contact with the under side of their respective keys; and when the platform A is raised, by moving the slotted bar, as described, the several adjustable pins are lowered from contact with the under side of the keys and removed sufficiently therefrom for the keys to be depressed without contact with them.

The rear end of each lower lever, G′, projects into the vertical line of movement of the valve-pitman I to the key corresponding in position, and when the platform is raised, by moving the slotted bar E, as described, this projection of the lever is just above the upper side of the button-head *f* of its valve-pitman without sensible contact therewith, and when the platform is lowered, by moving the slotted bar E, as described, it is in close contact with and presses upon said button head.

*e* is a series of springs at one end secured to the cap-strip F, and at their other and free ends arranged to press downwardly upon the upper sides of the upper levers, G, of the several pairs of levers G G′. There is a spring, *e*, for each pair of levers G G′, and its bearing in each instance upon its lever G is between the front end of the lever and the point of bearing of such lever upon the lower lever, G′.

Levers G G′, arranged as above described in relation to each other and to a key and a valve of an organ, are shown in all the figures of the drawings, except Fig. 6, as running diagonally in relation to the length of the keys—that is, the levers of each pair of levers take in at the front one key and at the rear a valve to another key of the instrument, and these two keys are an octave apart.

In Fig. 6 a pair of the levers G G′ is shown as running in a line coincident with the line of a key in one bank of keys and taking in at the front that key, and at the rear the valve to a key in another bank of keys.

With the levers G G′ arranged as above described and shown, and the platform A lowered as described, the touching and depression of a key—as, for instance, the key K—not only depresses the pitman I in line with and under it, as ordinarily, but at the same time, through its adjustable screw *c*, depresses the front end of the upper lever, G, and through it the rear end of the corresponding lever G′, which, in turn, depresses the pitman of the key L, which in all the figures in the drawings, except Fig. 6, is an octave from the key K, and in Fig. 6 a key coincident with the key K, but in another bank of keys. Thus two valves are opened—one the valve to the key touched and the other the valve to a key not touched—and a simultaneous sounding of the two notes represented by such keys is secured, and all by the touch of a single key.

With the levers G G′ arranged as above described and shown, and the platform A raised as described, the touch and depression of the key—as, for instance, the key K—depresses and opens only the valve to such key.

Fig. 2 shows the levers G G′ in position to secure the opening of a valve to a key when another key is struck, and Fig. 3 shows them as out of such operating position, and as they have been shown and described they serve as an octave and a manual coupler.

When the levers G G′ are off, which is when the platform A is raised, no movement of the levers occurs as the keys are struck, and there is no contact between the lower levers of each pair and the button-heads of their valve-pitmen, which are entirely free to rise and fall according as the action of their keys and valves may impel them—a point of great practical importance, and one which obviously entirely removes all possibility of jarring and of other disagreeable noises in the play of the valves and keys.

The arrangement of the springs *e* of the levers G G′, as the levers are put into an operative position, press and hold the lower levers to a firm and close bearing upon the buttons *f* of the valve-pitmen, and consequently there is no slack between the parts to be taken up when the keys to the levers are struck, and a simultaneous sounding of the notes of the pairs of notes so coupled is secured at every touch of the keys.

The springs *e* for the levers G G′ may be arranged in various ways other than that herein particularly described and secure the same action thereon—as, for instance, they may be secured to the cap-strip H in lieu of the cap-strip F; but it is not deemed necessary to herein describe them.

The adjustable pins *c*, between the keys and the upper levers, G, may be secured to the keys instead of to the levers G; but it is preferable to secure them to the levers G.

Again, the levers G G′, as to their peculiar construction, arrangement, and mode of application, may be modified in various ways without changing the principle of their action in relation to the keys and the valves, as herein described.

Having thus described my invention, what I claim, and desire to secure by Letters Patent, is—

1. The combination, with a key and a valve of an organ, of a spring between the key and the valve, arranged to operate substantially as described, to automatically assist the action of the key in opening the valve.

2. Levers G G′, combined and arranged with a key and a valve of an organ, to operate in a manner substantially as and for the purposes set forth.

3. The spring *e* and levers G G′, in combination with a key and a valve of an organ, when constructed and arranged to operate together substantially as and for the purposes described.

4. The combination of levers G and G′, arranged to operate substantially as described, with a platform, A, hinged at its front side, for the purpose set forth.

5. The combination and arrangement, substantially as described, of levers G G′ with a valve-pitman, I, and a platform, A, hinged at its front side, so as to act on the ends of said levers, which adjoin the pitman, for the purpose set forth.

6. The combination and arrangement, substantially as set forth, of levers G and G′ with a pitman, I, button *f*, or equivalent device, and a platform, A, hinged at its front side, so as to operate in the manner and for the purposes set forth.

7. The combination of a spring, *e*, and levers G and G′, arranged to operate substantially as described, with a pitman, I, and its button *f*, for the purposes set forth.

8. The combination of a spring, *e*, levers G and G′, and a platform, A, all arranged to operate in the manner, substantially as described, with a pitman, I, and its tappet or button *f*, for the purposes set forth.

9. The combination of the levers G and G′ with a platform, A, and actuating slide-bar E, the whole being arranged to operate in the manner substantially as described.

10. The combination of a spring, *e*, levers G and G′, with a platform, A, and actuating slide-bar, all being arranged to operate in the manner substantially as set forth.

11. The combination of levers G and G′, arranged to operate substantially as described, a platform, A, hinged at its front side, and its actuating slide-bar with a pitman, I, for the purposes set forth.

12. The combination of a spring, *e*, and levers G and G′, arranged to operate as described, with a pitman, I, and a platform, A, hinged at its front side, and its actuating slide-bar E, for the purposes set forth.

13. In combination with levers G and G′, arranged to operate as described, the regulating-screw *c*, pitman I, slide-bar E, and platform A, hinged at its front side, for the purpose set forth.

14. The combination of a key and its pitman I with a stud or pin, C, and levers G G′, arranged to operate upon the pitman I of another key, L, in the manner substantially as described.

15. In an octave or a manual coupler for an organ, the combination of the following instrumentalities: a key, K, and its pitman I, levers G G′, arranged to operate substantially as described, a stud, C, through which the levers are acted upon by the key K, a spring, *e*, so arranged as to constantly tend to depress the lever G′ upon the tappet or button of its corresponding pitman, a frame or platform, A, hinged at its front side, an actuating slide-bar, E, arranged to operate platform A in such manner that the latter acts on the rear instead of the front end of lever G′, and, lastly, a pitman, I, of a key, L, separate from the former or actuating key K, substantially as set forth.

WM. D. PARKER.

Witnesses:
WM. B. MAXWELL,
C. F. BROWN.